United States Patent [19]

Devanney

[11] 4,155,275
[45] May 22, 1979

[54] CONTROLLED TORQUE OUTPUT TOOL

[76] Inventor: Raymond H. Devanney, Platt Hill Rd., Winsted, Conn. 06098

[21] Appl. No.: 723,447

[22] Filed: Sep. 15, 1976

[51] Int. Cl.² .................... F16H 3/44; B25B/17/00;
[52] U.S. Cl. ........................... 74/789; 74/411.5; 192/4 R; 81/52.4 R
[58] Field of Search ............ 192/150, 192/4 R, 0.034; 81/57.11, 52.4 R; 64/28 R, 173/12; 144/32; 74/785, 789, 802, 411.5

[56] References Cited

U.S. PATENT DOCUMENTS

| 2,144,769 | 1/1939 | Melmer | 192/150 X |
|---|---|---|---|
| 2,152,517 | 3/1939 | Whitney et al. | 74/789 X |
| 2,600,327 | 6/1952 | Ridge | 81/52.4 R |
| 2,764,272 | 9/1956 | Reynolds | 173/12 X |
| 2,777,346 | 1/1957 | Brame | 192/56 R X |
| 3,115,791 | 12/1963 | Dean | 192/150 X |
| 3,162,250 | 12/1964 | Sindelar | 81/52.4 R |
| 3,289,715 | 12/1966 | De Groff et al. | 192/150 |
| 3,323,394 | 6/1967 | Bangerter et al. | 173/12 X |
| 3,613,853 | 10/1971 | Linthicum | 74/785 |
| 3,834,467 | 9/1974 | Fuchs | 173/12 |

FOREIGN PATENT DOCUMENTS

875483 8/1961 United Kingdom ............ 192/150

*Primary Examiner*—Samuel Scott
*Assistant Examiner*—Larry Jones

[57] ABSTRACT

A torque tool has a shaft which is driven by an input motor to transmit torque through an output gear. Reactive torque generated in reaction to the output torque is transmitted through a floating reaction ring gear to a brake assembly by means connecting the floating or rotatable ring gear to the brake assembly. The brake assembly is retained against rotation by resilient spring means of a preselected rotation resistance strength. Upon attainment of a preselected output torque and concomitant reactive torque, the brake assembly is shifted against the resistance offered by the springs so that the brake assembly contacts and brakes the shaft to limit the torque transmitted thereby. The means connecting the rotating ring gear to the brake assembly may include additional gear means designed to take up a portion of the reactive torque so that only a preselected balance of the total reactive torque is available to overcome the resistance offered by the resilient springs.

10 Claims, 18 Drawing Figures

CONTROLLED TORQUE OUTPUT TOOL

BACKGROUND OF THE INVENTION

Torque tools for stepping up or stepping down applied torque are known and essentially comprise a torque input and a torque output between which is interposed a gear train to step up or step down the output torque. Generally, a motor provides torque input to the torque tool and the output torque is applied to an object to be torqued by means of a chuck or other suitable connector. One problem associated with such torque tools is to limit the output torque to a preselected level. Prior devices for limiting torque output are well known as exemplified by, e.g., U.S. Pat. No. 2,152,517; 3,515,251; and 3,613,853. However, one problem which is not always satisfactorily overcome by prior devices is that of applying the torque uniformly and smoothly with minimum impact forces being applied to the object or member being torqued.

It is accordingly an object of the present invention to provide a novel torque tool which overcomes the foregoing problems and which permits smooth application of torque to a member or object by means of a device in which the torque output level is limited to a preselected value.

It is another object of the present invention to provide a torque tool which feeds back reactive torque to actuate a braking means which controls the torque output from the tool.

It is another object of the present invention to provide a pneumatic motor operated torque tool and one in which the level of reactive torque required to apply the braking means to the torque transmission shaft can be selected by simple adjustments of the tool.

Other advantages and objects of the invention will be apparent from the following description.

SUMMARY OF THE INVENTION

A torque tool comprises the following elements. Transmission means adapted to be connected to a motor for rotation and including a driver input shaft assembly and an output gear rotatable therewith, a first planetary gear means and a torque output gear which is drivingly connected through said first planetary gear means with the transmission means for rotation of the output gear to transmit output torque therethrough. A rotatable reaction ring gear is drivingly connected with the output gear so as to sense the reactive torque transmitted through the output gear in reaction to the output torque. A brake means assembly includes means shiftable from a first non-braking position into braking engagement with the shaft assembly of the transmission means. Restraint means are structurally associated with the brake means assembly so as to provide a predetermined resistance to shifting of the brake means assembly from the first position into the braking engagement. Means connect the brake means assembly to the rotatable ring gear whereby the rotatable ring gear is held against rotation relative thereto by the brake means assembly. Upon attainment of a preselected torque output and concomitant reactive torque, the latter is transmitted through the rotatable ring gear whereby the rotatable ring gear rotates to shift the brake means assembly against the resistance and from its first position into braking engagement with the transmission means to limit the effective torque throughput thereof.

Certain objectives of the invention are attained when the torque tool further includes a second planetary gear means and a stationary ring gear. The means connecting the brake means assembly to the rotatable ring gear comprises the second planetary gear means, the second planetary gear means is meshed with the rotatable ring gear and the stationary ring gear for orbiting in the latter and is connected to the brake means assembly. The second planetary gear means further has a gear ratio relative to the stationary ring gear such that a preselected proportion of the reactive torque is required to orbit the second planetary gear means in the stationary ring gear, whereby only the balance of the reactive torque is available to shift the brake means against the resistance and into the braking engagement.

Other objectives of the invention are attained by providing the torque tool with a housing having an input end and an output end and providing the transmission means in the form of a transmission shaft received within the housing and having an input portion and an output portion. An adaptor may be provided on the input portion of the shaft to receive input torque from a motor. A sun gear is provided on the output portion of the shaft and the first planetary gear means are meshed with the sun gear for rotation thereby. The torque output gear is journaled in the output end of the housing and is meshed with the first planetary gear means, the output gear being adapted to transmit output torque from the tool. A rotatable reaction ring gear is journaled in the housing intermediate the input and output ends thereof and is meshed with the first planetary gear means for rotation thereby in response to reactive torque acting through the first planetary gear means. Brake assembly means are mounted within the housing and include a carrier, brake members carried by said carrier, and shiftable means mounted for at least limited shifting from a first position to a second position, the brake members being carried by the carrier in a non-braking position relative to the shaft when the shiftable means is in said first position. Restraint means engage the shiftable means to resist the rotation of the shiftable means from the first position, the restraint means having a preselected resistance to such shifting. Means connect the rotatable ring gear with the shiftable means whereby rotation of the rotatable ring gear is resisted by the restraint means to a degree dependent upon the strength of resistance thereof. Thereby, upon attainment of a preselected output torque, concomitant reactive torque acts to overcome the resistance of the restraint means to rotation of the rotatable ring gear and rotates the rotatable ring gear to shift the shiftable means from the first position to a second position in which the brake members are in braking engagement with the transmission shaft to limit the torque throughput thereof.

Other objectives of the invention are attained by including in the torque tool a stationary reaction ring gear fixedly mounted within the housing so that it is non-rotatable relative thereto and second planetary gear means. The second planetary gear means are meshed with the rotatable ring gear and with the stationary ring gear and connected to the carrier. Thereby, rotation of the rotatable ring gear to orbit the second planetary gear means in the stationary ring gear is resisted (1) by the stationary ring gear to a degree determined by the gear ratio between it and the second planetary gear means and (2) by the restraint means to a degree dependent upon the strength of resistance thereof. Thereby, upon attainment of a preselected output torque, concomitant reactive torque acts to overcome the resistance of the stationary ring gear and the resistance of the restraint means to rotation of the rotatable ring gear. This rotates the rotatable ring gear to shift the shiftable means from the first position to a second position in which the brake members are in braking engagement with the transmission shaft to limit the torque throughput thereof.

BRIEF DESCRIPTION OF THE DRAWINGS

FIG. 3b is a longitudinal sectional view of the adaptor sub-assembly of FIG. 3a;

FIG. 4b is a sectional view along line 4b—4b of FIG. 4a;

DETAILED DESCRIPTION OF THE PREFERRED EMBODIMENTS

Figures 1, 2:
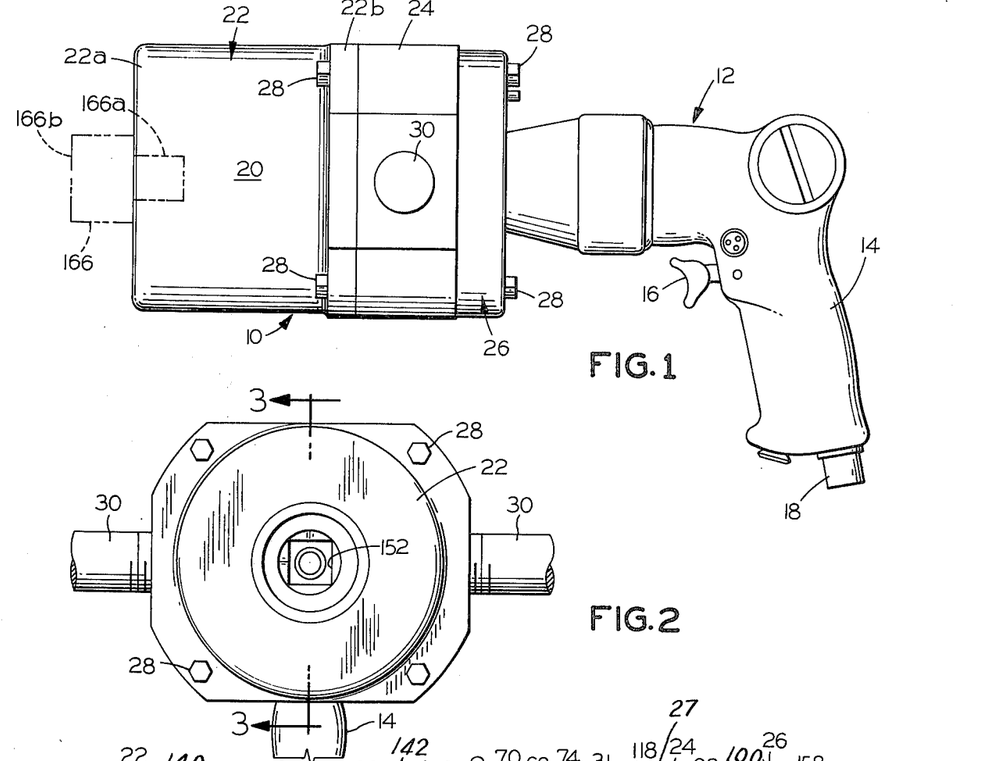
FIG. 1 is a side elevational view showing one embodiment of the invention with a motor attached thereto.
FIG. 2 is a fragmentary end elevational view in elevation of the FIG. 1 embodiment, taken from the left hand end of FIG. 1 as viewed in the drawings.

Referring now to the drawings and more particularly to FIGS. 1 and 2 thereof, an embodiment of a torque tool of the invention is generally indicated at 10 and has a pneumatic motor 12 engaged therewith. Motor 12 is a hand-held motor and includes a handle 14, a trigger 16 to operate the motor, and a compressed air connection 18.

Torque tool 10 has a housing 20 comprising an assembly of output end section 22, an intermediate section 24 and an end plate 26. The components of housing 20 are held together by bolts 28. Reaction bars 30 are fixed to housing 20 by being threaded into intermediate housing section 24.

Figure 3:
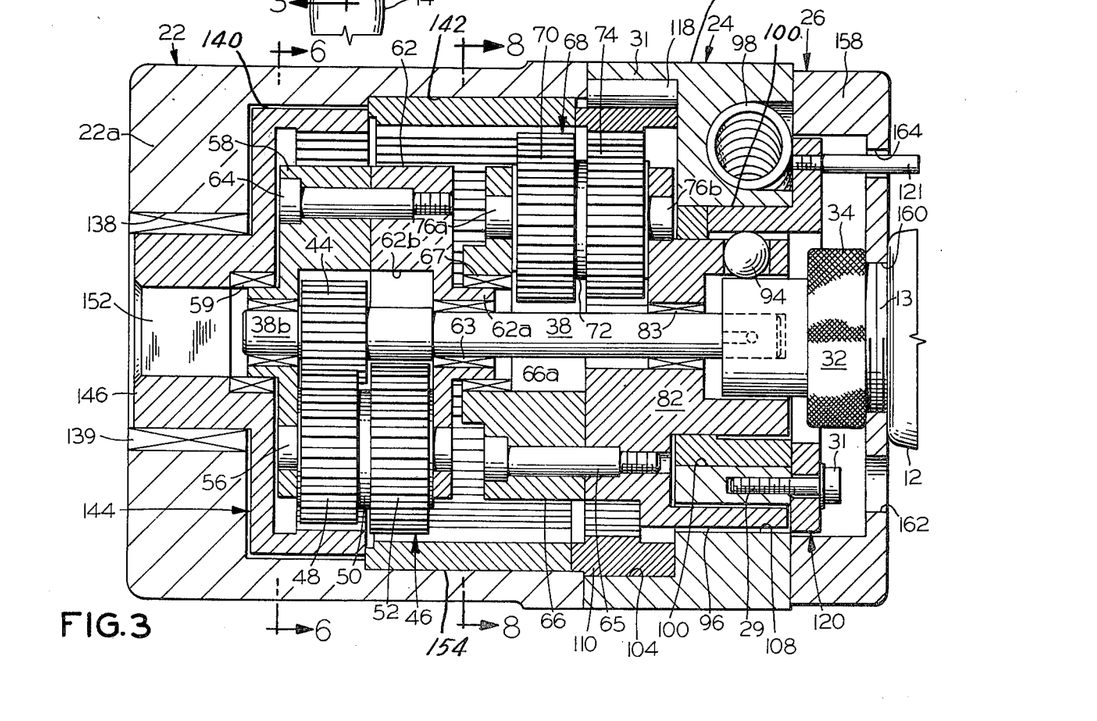
FIG. 3 is a sectional view taken along line 3—3 of FIG. 2 and to an enlarged scale.

Referring to FIG. 3, first end section 22 is seen to have a substantially cylindrical portion 22a and a flange portion 22b. Within cylindrical portion 22a there is formed a first cylindrical shaped opening 138, a second cylindrical shaped opening 140 and a third cylindrical shaped opening 142. Openings 138, 140 and 142 are coaxially aligned and are cylindrical in shape. Opening 138 has the smallest diameter, opening 140 being next larger, and opening 142 being the largest in diameter of the three openings.

A torque output gear 144 has a chuck 146 and a larger diameter ring portion 148. Torque output gear 144 is journaled within cylindrical shaped openings 138 and 140 for rotation therein on pin bearings 139.

Figure 4:
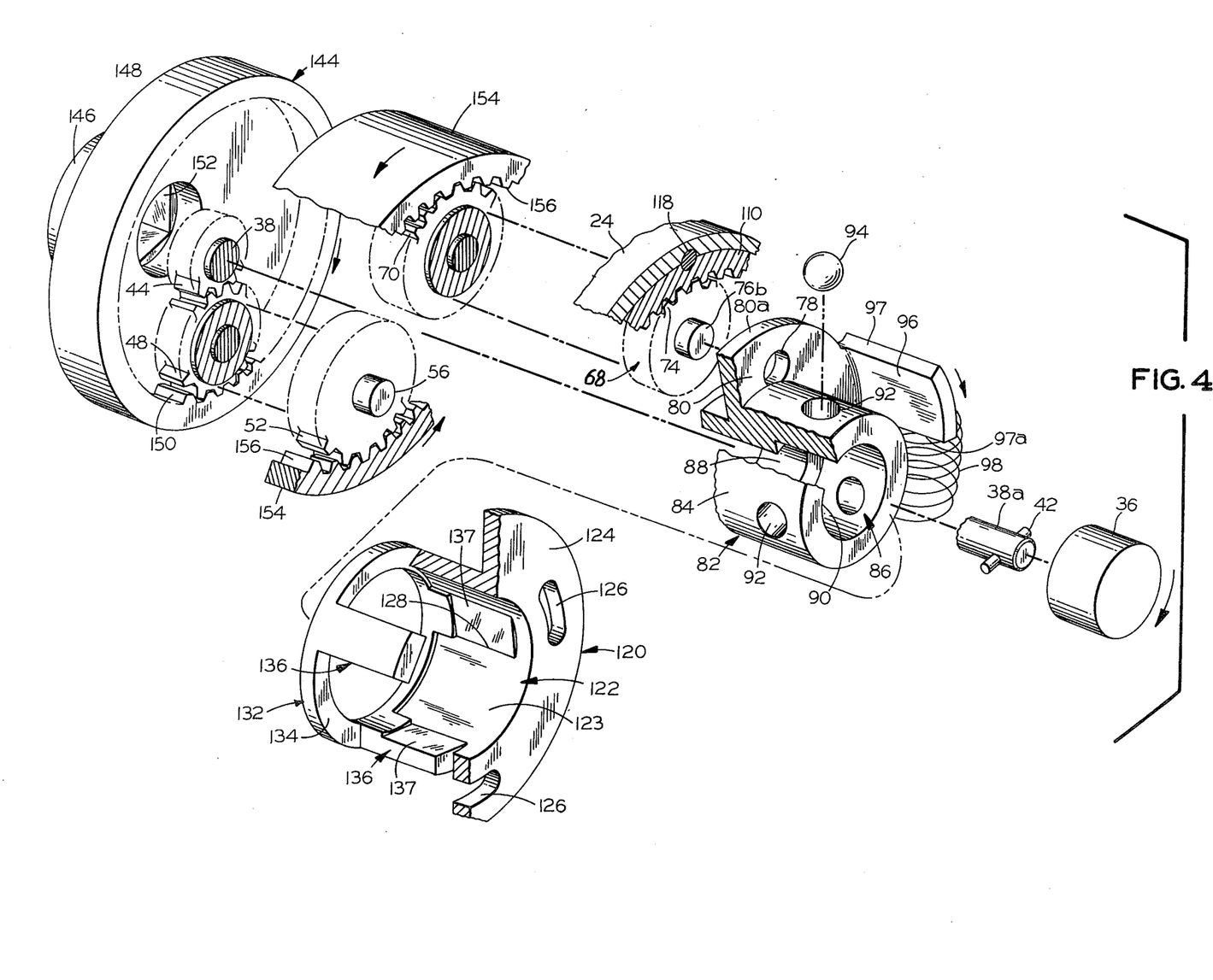
FIG. 4 is a partially exploded view of some of the operating components the torque tool of FIG. 3 with some components broken away and others fragmentarily illustrated.

As best seen in FIGS. 3 and 4, ring portion 148 has gear teeth 150 disposed along the entire interior periphery thereof. Chuck portion 146 has a chuck connector 152 which is adapted to be engaged with the means to which it is desired to transmit torque.

A floating ring gear 154 is journaled within third cylindrical shaped opening 142 for rotation therein. Floating ring gear 154 has geared teeth 156 disposed along the entire inner periphery thereof.

Referring particularly to FIGS. 3 and 4, input connector means 32 comprises an input chuck 34 and an adaptor 36, the latter being connected to transmission shaft 38. Chuck 34 is suitably threaded to receive output shaft 13 of motor 12 so that adaptor 36 and shaft 38 may be rotationally driven by motor 12. Shaft 38 is connected with adaptor 36 for rotation therewith by means of a keyway opening 40 (best seen in FIG. 5) which receives the opposite ends of a pin 42 affixed in a radial passage through input end 38a of shaft 38.

An output end 38b (FIG. 3) of shaft 38 has mounted thereon a sun gear 44. Sun gear 44 is drivingly engaged with a first planetary gear means comprising a set of three gears, only one of which, gear 46, is shown in FIGS. 3 and 4. The three gears 46 of the first planetary gear means are equally spaced apart about 120° apart along an imaginary circle lying in a plane perpendicular to and centered on the longitudinal axis of shaft 38, as may best been seen in FIG. 6.

Figures 5, 6, 7, 8, 9:
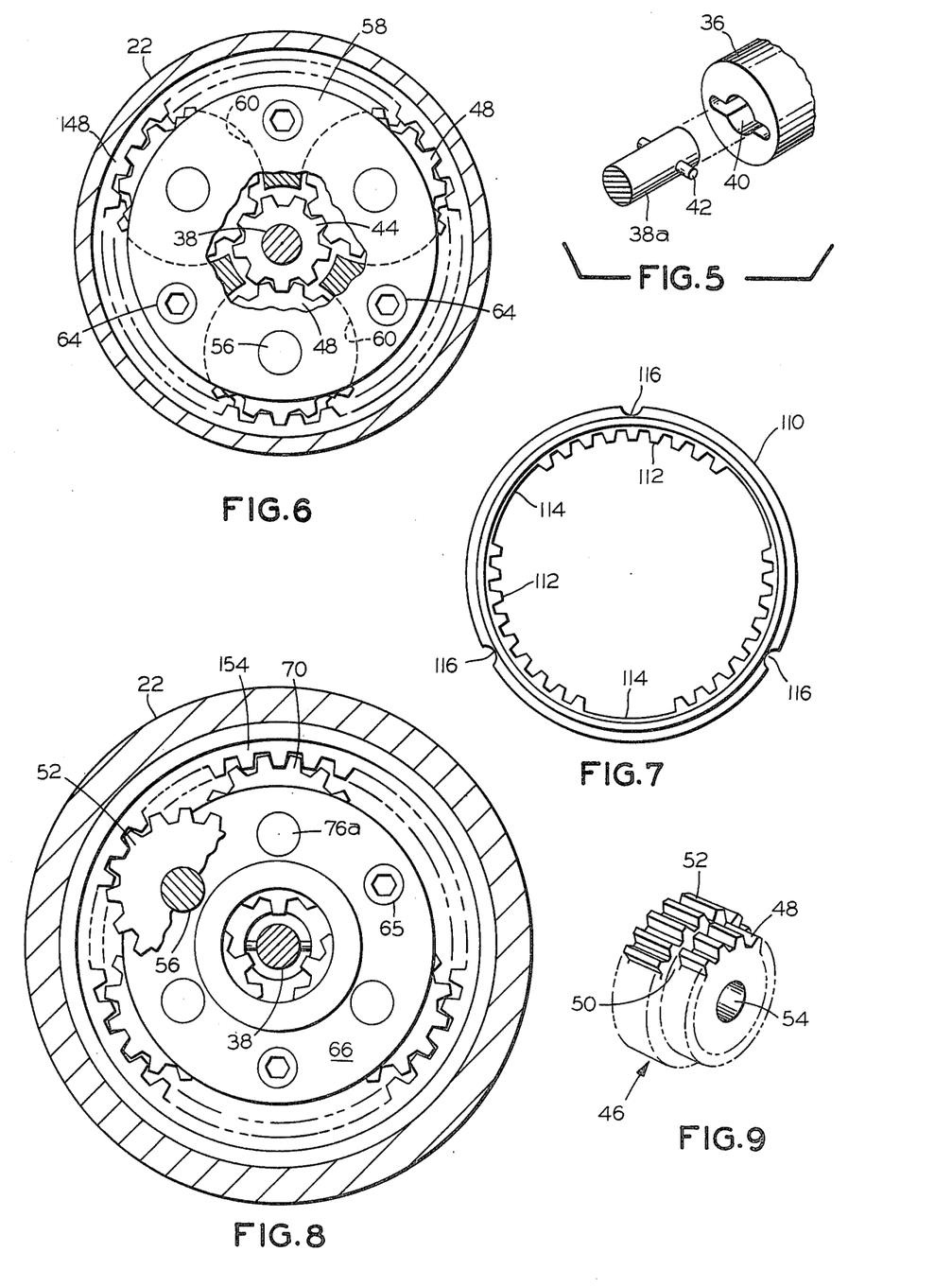
FIG. 5 is an exploded view of the shaft and adaptor subassembly of the torque tool of FIGS. 1-4.
FIG. 6 is a sectional view taken along line 6—6 of FIG. 3 with some components broken away and to a reduced scale.
FIG. 7 is an end elevational view of the stationary ring gear and associated portion of the housing of the torque tool of FIGS. 1-4.
FIG. 8 is a sectional view taken along the line 8—8 of FIG. 3 but with a portion of gear 52 also shown.
FIG. 9 is a perspective view of a typical planetary gear member employed in the torque tool of FIGS. 1-4.

As best seen in FIGS. 3 and 9, gear 46 comprises a toothed driven portion 48, an intermediate portion 50, and a toothed driving portion 52. Driving portion 52 has a gear diameter somewhat larger than driven portion 48. Driven portion 48 and driving portion 52 are not movable with respect to each other and, in fact, gear 46 is advantageously an integral, i.e., one piece gear. A shaft opening 54 passes through the center of gear 46 and is adapted to have gear mounting shaft 56 journaled therein (FIGS. 3 and 4). In FIG. 6, driven portions 48 of the three gears 46, which together comprise the first planetary gear means, are shown.

Each of the three gears comprising the first planetary gear means is mounted in a first gear mounting plate 58 which, as best seen in FIG. 6, is a generally disc shaped plate having three circular shaped intersecting cutouts 60 within which gears 46 are received. Gear mounting plate 58 is journaled within chuck portion 146 of output gear 144 on pin bearings 59. The hub portion 62a of second gear mounting plate 62 is journaled on shaft 38 by pin bearings 63. The central portion of first gear mounting plate 58 is also cut away to admit the output end 38b of shaft 38 therethrough, and to provide clearance for sun gear 44.

A second gear mounting plate 62 is similarly disc shaped and likewise contains intersecting circular cutout portions adapted to receive therein driving portion 52 of gears 46. Second mounting plate 62 also has a central hub portion 62a and a central cutaway portion 62b through which shaft 38 passes. First gear mounting plate 58 is secured to second gear mounting plate 62 by a plurality of bolts 64.

A third gear mounting plate 66 has a hub portion 66a and a central opening 66b formed therein, through which shaft 38 passes. Hub portion 66a of third gear mounting plate 66 is journaled on the outer portion of hub 62a by pin bearings 67.

Three gears 68, similar in construction to gears 46, together comprise a second planetary gear means. Gears 68 each have a toothed driven portion 70, an intermediate portion 72, and a toothed driving portion 74. Gears 68 are mounted on a gear shaft 76, one end 76a of which is journaled in third gear mounting plate 66 and the other end of which, 76b, is mounted in an opening 78 (FIG. 4) formed in flange 80 of carrier 82.

Figure 4A:
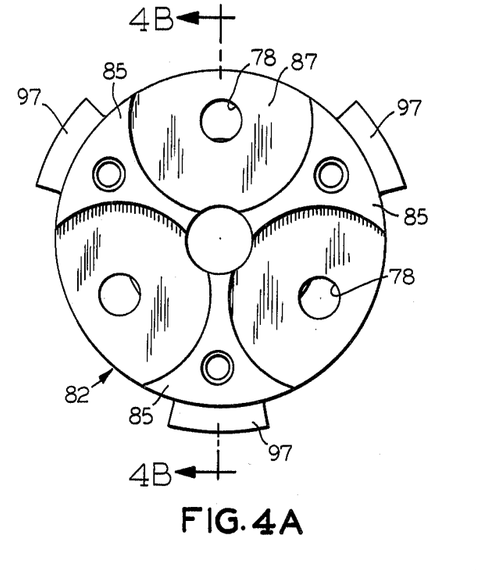
FIG. 4a is an end elevational view of the carrier 82 of FIGS. 3 and 4 as seen from the left.
Figure 4B:
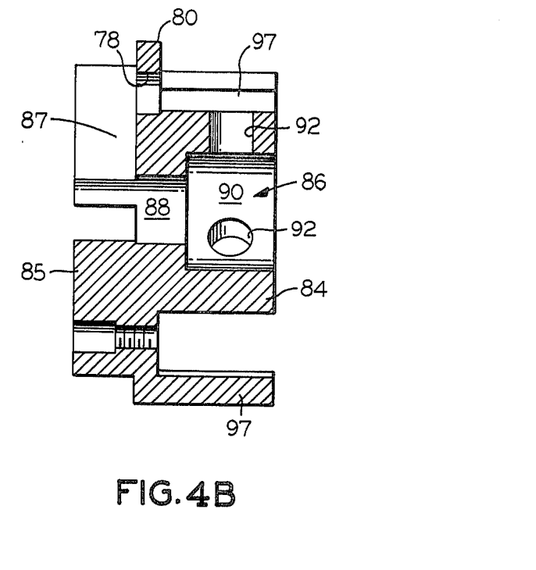

Carrier 82 includes a collar portion 84 and a base portion 85. Collar portion 84 is generally cylindrical in shape and has a central opening 86 formed therein. (See FIGS. 4, 4a, and 4b). Central opening 86 is formed in two sections, one being a shaft opening 88 and the other being an adaptor opening 90, the latter being of larger diameter than the former. Shaft opening 88 has shaft 38 journaled therein by pin bearings 83. As best seen in FIG. 4a, base portion 85 has three partial circular cutouts 87 formed therein, to receive respective ones of driving portions 74 of gears 68. Three openings 78 receive respective ones of shaft ends 76 at intervals of about 120° about the circumference of flange 80. Collar portions 84 of carrier 82 contain three radially extending passages 92 equally spaced about the circumference of the collar portion 84. Radially extending passages 92 are adapted to carry therein brake members comprising, in the illustrated embodiment, balls 94. Only one of balls 94 is shown in FIGS. 3 and 4.

A boss 96 extends from the outer periphery 80a of flange 80 and extends axially of carrier 82 for approximately the same distance as collar portion 84. Boss 96 is one of three identical bosses spaced equally about the periphery 80a of flange 80 so that the center line of each boss 96 is about 120° from the center line of the two adjacent bosses. Bosses 96 have side edges 97. A compression spring 97 is so positioned relative to carrier 82 that side edge 97 contacts one end of compression spring 98 by its alignment with the circular end of spring 98. Thus, each side edge 97 engages the circular end of spring 98 at two points on diametrically opposite sides of the end of the spring.

Figure 10:
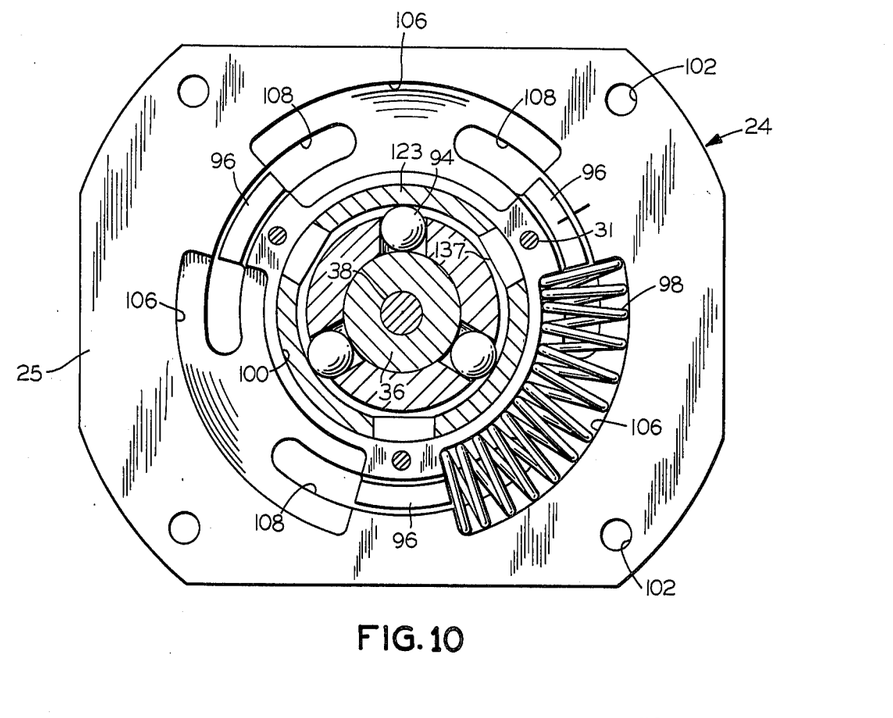
FIG. 10 is an end elevational view of the right hand end (as viewed in FIG. 3) of intermediate section 24 of the torque tool of FIGS. 1-4 with only one spring in position and with some parts in section.

Referring now to FIGS. 3, 4, 10, and 11, intermediate housing section 24 has a flange portion 25 (as seen in FIG. 10) a main body portion 27 (as seen in FIG. 3) and a ring gear mounting section 31 (FIGS. 3 and 4). Bolt holes 102 are provided in flange 25 to receive bolts 28 to secure intermediate housing section 24 to first end section 22.

Main body portion 27 of section 24 is substantially cylindrical in shape and section 24 has an axial bore 100 extending therethrough with an enlarged portion 104 in the ring gear mounting section 31.

Referring to FIGS. 3 and 10, it is seen that three elongated spring wells 106 are formed in the face of main body portion 27 of intermediate section 24 and face toward the input end of the unit. The wells are arcuate in their longitudinal configuration so that the longitudinal center lines of the wells lie in a circle centered on the longitudinal axis of shaft 38 (FIG. 10). Spring wells 106 are equally spaced about the longitudinal axis so that the longitudinal center of each well is spaced about 120° from the center of the adjacent wells. In transverse cross section (as seen in FIG. 3) spring wells 106 are substantially U-shaped to provide for receiving compression springs 98 therein.

Three elongated finger slots 108 are formed in the main body portion 27 and spaced between and interconnect spring wells 106. Like spring wells 106, finger slots 108 are longitudinally arcuate (as best seen in FIG. 10), their longitudinal axes falling in a circle centered on the longitudinal axis of shaft 38. Finger slots 108 are equally spaced about this imaginary circle, the center portion of each slot 108 being disposed about 120° from the longitudinal center portion of the adjacent slots. Slots 108, not visible in FIG. 3, extend entirely through main body portion 27 to form an arcuate shaped passage extending about one third of the arc of each adjacent spring well 106. As described below, this enables fingers 96 of carrier 82 to be rotated into spring wells 106 and against the resistance offered by compression springs 98, thereby to compress the latter.

Referring to FIGS. 3 and 7, the stationary ring gear 110 has teeth 112 disposed in three sections equally spaced about its inner periphery. These toothed sections are separated by smooth or untoothed portions 114.

The outer periphery of stationary ring gear 110 has a plurality of axially extended semi-circular notches 116 formed therein. Notches 116 are aligned with corresponding semi-circular notches (un-numbered) formed in the periphery of second central opening 104 so that with the un-numbered notches and notches 116 aligned with each other, pins 118 inserted in the openings formed by the aligned notches serve to lock stationary ring gear 110 within second central opening 104 of intermediate section 24.

Figure 12:
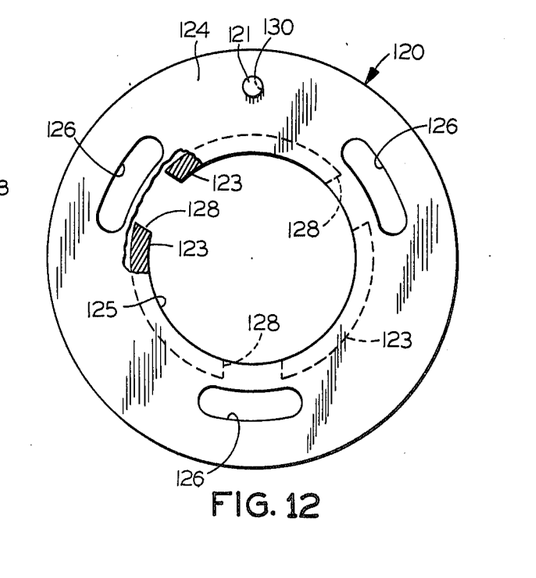
FIG. 12 is a end view in elevation of the end elevational plate employed in the torque tool of FIGS. 1-4 with some portions broken away.

Referring to FIGS. 3, 4, and 12, end ring 120 has a hub 122 and a flange 124. Three elongated bolt slots 126 are equally spaced about flange 124. As best seen in FIG. 12, bolt slots 126 are arcuate so that the longitudinally extending center lines of bolt slots 126 lie along a circle centered on the longitudinal axis of end ring 120. Hub 122 has three elongated cutout portions 128 which are aligned with the centers of slots 126 and which divide hub 122 into three equally spaced fingers 123. A single bolt hole 130 is formed in flange 124 equidistantly between two bolt slots 126.

As best seen in FIGS. 3 and 10, main body portion 27 of intermediate section 24 has formed therein three axially extending bolt holes 29 which are equally spaced about portion 27 so that bolt holes 29 are spaced 120° one from the other. Bolt holes 129 being thus positioned can be aligned with bolt slots 126 in end ring 120 as explained in more detail below. Bolts 131 (FIG. 3) serve to secure end ring 120 to main body portion 27. In FIG. 10, the cross hatching within bolt holes 29 indicates a section taken through bolts 31.

End plate 26 (FIG. 3) is affixed by bolts 28 to housing section 24. The disc shaped body 158 of end plate 26 has a central circular opening 160 through which output shaft 13 extends into engagement with input chuck 34. A plurality of axially extending bolt access holes 162 are aligned with each of bolts 31 for purposes to be described hereinbelow. A slot 164 is also formed in end plate 158 to permit the protrusion therethrough of rotation handle 121 which is of pin-like configuration and secured to end ring 120 by being threaded into bolt hole 130.

Figure 11:
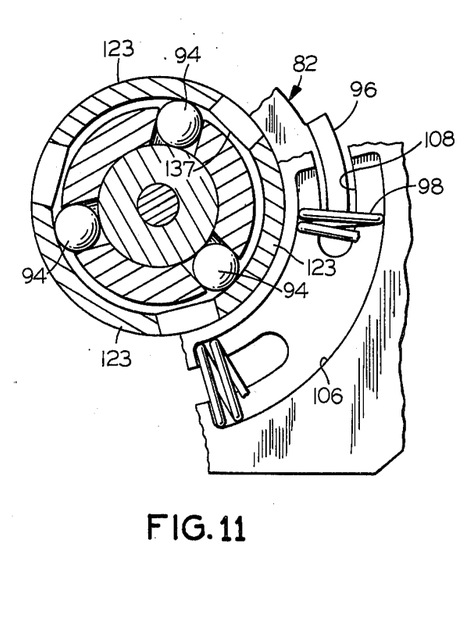
FIG. 11 is a fragmentary view similar to FIG. 10 but showing some components in different relative position.

Referring particularly to FIG. 4, a brake ring-shaped body 132 has a ring portion 134 and three axial extensions 136. Extensions 136 comprise elongated axially extending segments of ring 134 and are equally spaced about the periphery of ring 134 so that each extension 136 is spaced at about 120° from each other extension about ring 134. As best seen in FIG. 4 and FIGS. 10 and 11, extensions 136 have inner cam surfaces 137 which have been machined or otherwise shaped to show in profile a non-concave surface, i.e., one which is either flat or slightly convex cam. Flat or convex surfaces 137 extend longitudinally along extensions 136 for a distance sufficient to extend over passages 92 formed in carrier 82 when the components are assembled.

In operation, tool 10 is mounted by suitable anchor means (not shown) so as to engage chuck 152 with a tool accessory 166 shown in dotted outline in FIG. 1. Tool accessory 166 may be any suitable accessory having a stem portion 166a adapted to be received within and drivingly engaged by chuck 152 and having a tool portion 166b adapted to engage a member to which torque is to be applied. Depressing trigger 16 rotates shaft 13 of tool 12 which, acting through adaptor 36, rotates shaft 38 and sun gear 44. Sun gear 44 in turn drives gears 46 of the first planetary gear means to rotate torque output gear 144 in the direction shown by the curved arrow associated therewith in FIG. 4. Driven portions 48 of gears 46 are meshed with gear teeth 1150 of torque output gear 144 to drive the same, as planetary gears 46 orbit within output gear 144.

As the torque delivered by torque output gear 144 increases, reaction thereto, i.e., reactive torque, causes the driving portion 52 of gears 46 to urge rotatable ring gear 154 in the direction shown by the curved arrows associated therewith. In turn, by virtue of the meshed engagement of driven portion 70 of gears 68 with rotatable ring gear 154, gears 68 are similarly urged to orbit within stationary ring gear 110. Driving portion 74 of gears 68 are meshed with stationary ring gear 110 for such orbiting. Since the gear shaft ends 76a are connected to respective openings 78 in flange 80 of carrier 82, carrier 82 is also urged to rotate relative to end plate 120 under the reactive torque. But because bosses 96 of carrier 82 engage compression springs 98, such rotation is resisted by the compression strength of springs 98. However, when the torque output and therefore the reactive torque is high enough to overcome the resistance of compression springs 98, ring gear 154 is rotated which orbits gears 68 of the second planetary gear means. This rotates carrier 82 and causes bosses 96 to travel through slots 108 and spring wells 106 against the resistance of springs 98, which are compressed thereby. This may be appreciated by considering FIGS. 10 and 11 together. FIG. 10 shows the tool before any rotation of reaction gear 154 has taken place. Balls 94 are seen to be the maximum distance from inner surfaces 137 of extensions 136. In FIGS. 11, compression springs 98 have been compressed within spring well 106 by the travel of bosses 96 as described above. As rotation of carrier 82 continues, balls 94 are brought into contact with inner cam surfaces 137 of extensions 136 of ring portion 134. The flat or slightly convex inner cam surfaces 137 have a wedging effect on balls 94 and tend to wedge them against adaptor 36. This exerts a braking action on adaptor 36, thus limiting the amount of torque applied via shaft 38 to output gear 144.

Referring again to FIG. 10, the pre-rotation position of balls 94 relative to inner cam surfaces 137 shows that a given amount of rotation of carrier 82 is necessary to wedge balls 94 between inner cam surfaces 137 and adaptor 36 to initiate the braking action. The amount of rotation required to initiate such braking action or engagement may be adjusted by rotating end plate 120 relative to housing section 24. This may be accomplished simply by loosening bolts 31 and rotating end ring 120 by means of handle 121. The extended arcuate shape of slot 164 permits handle 121 to travel therein, and the similar arcuate shape of slots 126 (FIGS. 4 and 12) similarly permits rotation of end ring 120 about bolts 31. With end plate 120 rotated to its desired position to change the travel distance between balls 84 and inner cam surfaces 137, bolts 31 are retightened. In this manner, the total degree of rotation required for carrier 82 to move from its first, no-load position until balls 94 are wedged in braking engagement by inner cam surfaces 137, may be selected as desired. This enables the selection of the level of output torque and concomitant reactive torque at which the braking action will commence.

A wider range of selection of the torque output value at which braking will commence may be accomplished by replacing compression springs 98 with similar springs of different compression strength, and therefore different resistance to rotation of carrier 82. This is done by removing end plate 158 and end ring 120 by removing the bolts 28 (FIG. 2) and bolts 31. Compression springs 98 may then be removed from wells 106 and can be replaced with compression springs of different compressive strength. End ring 120 and end plate 158 are then replaced and now the resistance offered by springs 98 to movement of bosses 96, and consequently to rotation of carrier 82, is changed. Obviously, the replacement springs may be of either increased or decreased compressive strength as desired.

It will be noted that the engagement of gears 68 in stationary ring gear 110 offers resistance to orbiting of gears 68 of the second planetary gear means which resistance is independent upon the gear ratio between the driving portion 74 of gear 68 and stationary ring gear 110. Therefore, that portion of the reactive torque used to orbit gears 68 in stationary ring gear 110 is ultimately transmitted from gears 68 to ring gear 110 and imparts a torque to housing 20 in which stationary ring gear 110 is fixed. This torque is resisted by suitably anchoring reaction bars 30 to hold tool 10 against the reactive torque. Straps or other devices "ground" tool 10 by securing reaction bars 30 to any suitable anchoring structure, not shown in the drawings. In this manner, only that portion of the reactive torque in excess of that required to orbit gears 68 is available to act against the resistance strength of springs 98. The reactive torque forces acting on springs 98 are thus reduced to a fraction, for example 10%, of the total reactive torque. This permits the use of smaller springs 98 and thereby more accurate calibration of the compression springs.

Figure 3A:
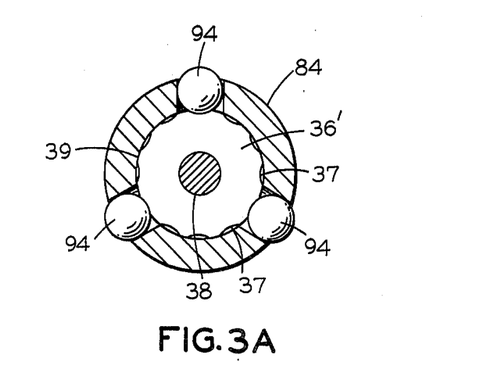
FIG. 3a is a transverse sectional view showing an alternate embodiment of the adaptor 36 of FIGS. 3 and 4 in combination with the balls and collar of the carrier.
Figure 3B:
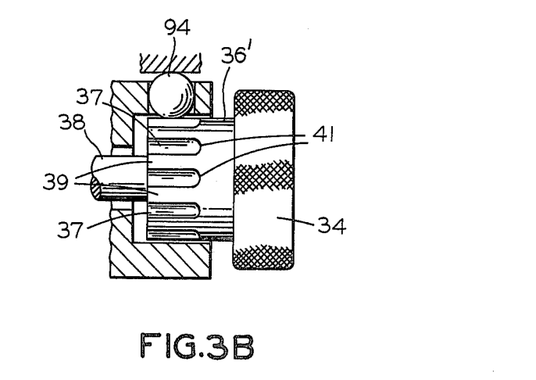

When conditions are such that the amount of braking action required is only a relatively small proportion of the total torque throughput, a smooth portion of the shaft, such as the adaptor 36, performs satisfactorily as the surface on which balls 94 bear to provide the braking action. However, when a large proportion of the total torque is required to be braked, sufficient braking action may not be attained by the combination of a smooth surface and balls rolling thereover. Obviously other embodiments of the braking members can be employed. One alternative, usable with ball type braking members, is to provide a serrated surface on shaft 38. This alternative is illustrated in FIGS. 3a and 3b. As shown in FIG. 3a, the only change from the embodiment shown in FIG. 3 is that the adaptor, here denominated 36', is formed with a plurality of detent grooves 37 in the surface thereof, extending about the periphery of adaptor 36' and generally parallel to the longitudinal axis thereof. Detent grooves 37 terminate in ends 41 with the grooves extending axially over the braking surface of the outer periphery of adaptor 36'. Lands 39 are formed between adjacent detent grooves 37. As best seen in FIG. 3a, detent grooves 37 are quite shallow but nonetheless provide some locking engagement for balls 94, thereby greatly enhancing the braking action. Regardless of the specific form of adaptor 36 or 36', it comprises a part of transmission shaft 38, or more specifically a part of the input portion thereof, and obviously may be formed integrally therewith.

Figure 13:
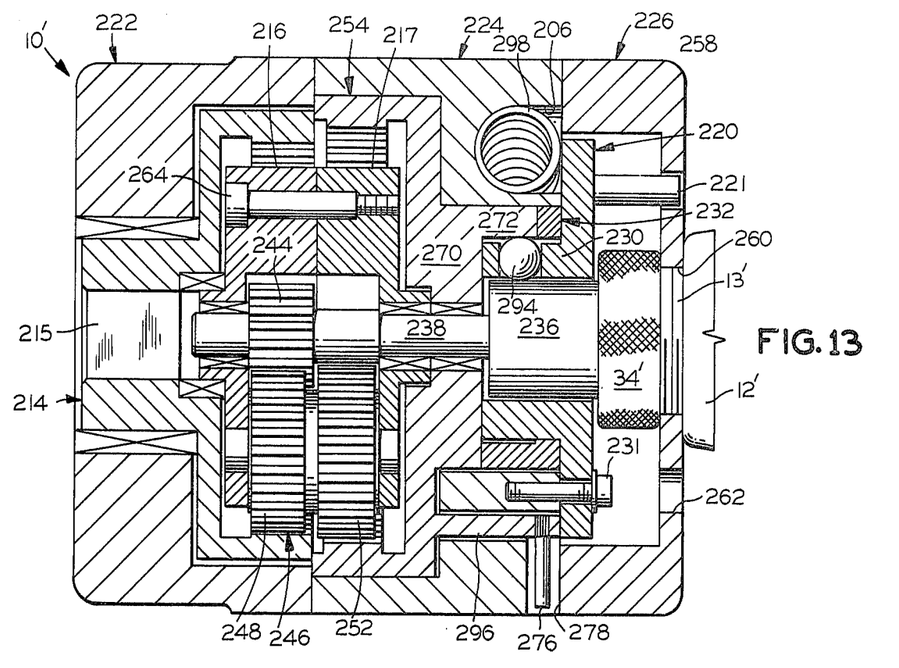
FIG. 13 is a longitudinal sectional view of another embodiment of the torque tool of the invention, this section generally corresponding to that of FIG. 3.
Figure 14:
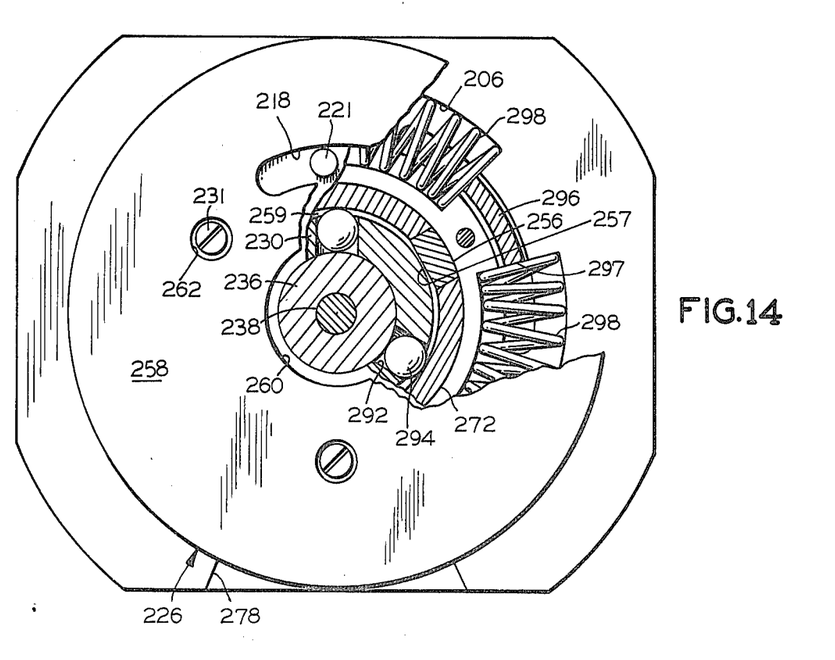
FIG. 14 is an end elevational view with parts broken away and the motor removed, of the right hand end (as viewed in FIG. 13) of the torque tool of FIG. 13.

The braking means assembly generally comprises carriers 82 and balls 94, and the shiftable means in the embodiment of FIGS. 1-4 comprises specifically flange 80 of carrier 82. In the embodiment of FIGS. 13 and 14, described below, it is bosses 296 which comprise the shiftable means. Reference in this specification and in the claims to shifting of the brake assembly does not necessarily mean shifting of the entire brake assembly but has reference to shifting of operative parts thereof, normally just the shiftable means and parts associated to travel therewith.

Some of the components of the brake assembly do not shift as relative movement therebetween is required to initiate the braking action.

Referring now to FIGS. 13 and 14, there is shown another embodiment of the invention which is somewhat simpler in construction. Essentially, the embodiment of FIGS. 13 and 14 omits the stationary ring gear and the second planetary gear means. The rotatable reaction ring gear is provided with a hub section from which fingers and bosses extend, the former serving as the shiftable means which engage appropriate bearing surfaces with the brake members and the latter serving to engage the springs which serve as the restraint means to hold the rotatable ring gear against rotation.

Referring to FIG. 13, torque tool 10' has a housing 200 comprising an assembly of output end section 222, intermediate section 224 and end plate 226.

Except as indicated above, the construction of the embodiment of FIG. 13 is generally similar to that of the embodiment of FIGS. 1-4. Thus, housing 200 is equipped with handles (not shown) similar to those handles 30 shown in FIG. 2, and end plate 226 has a disc shaped body 258 in which a central circular opening 260 (FIG. 14) is disposed to receive output shaft 13' of motor 12'. As with the FIGS. 1-4 embodiment, an output chuck 34' is received interiorly of end plate 226 and effects a connection in the known manner to adaptor 236.

The transmission shaft 238 is connected at its input end to adaptor 236, and has a sun gear 224 affixed its adjacent output end. Gear 246 of the set of three planetary gears has a driven portion 248 and a driving portion 252.

A torque output gear 214 has a chuck connector 215 for connection to the member to be torqued by the tool. Gear mounting plates 216 and 217 are secured together by bolts 264. Compression springs 298 are received within spring wells 206.

Body 258 of end plate 226 has an arcuate slot 218 formed therein through which rotation handle 221 may be moved to rotate end ring 220 to adjust the tool in a manner similar to that described with respect to the embodiment of FIGS. 1-4.

In the FIGS. 13-14 embodiment however, the brake members comprising balls 294 are carried in a collar 230 which is generally cylindrical in shape and projects from the center of end ring 220. Three radial passages 292 spaced about 120° of arc apart from each other along collar 230, are provided to receive one each of the three balls 294. Balls 294 ride on adaptor 236 in the annular space formed between it and fingers 272 of hub portion 270 of rotatable ring gear 254.

Referring particularly to FIG. 13, rotatable ring gear 254 is seen in this embodiment to have a central or hub portion generally indicated at 270. A series of three axially extending FIG. 272 on the ring gear 254 to define a generally cylindrical shaped opening, within which collar 230 of end ring 220 is co-axially received. As best seen in FIG. 14, the fingers 272 separated by spaces within which are received extensions 256 of a brake ring 232. The configuration of brake ring 232 is similar to that of brake ring 132 best seen in the exploded view of FIG. 4. Extensions 256 thus have cam surfaces 257 which, like cam surfaces 137, are flat or even slightly convex so they protrude into the annular space 259 (FIG. 14) formed between the outer surface of collar 230 and the inner surface of fingers 272.

In general, the inter-engaging relationship between fingers 272 attached to hub portion 270 of rotatable ring gear 254, and extensions 257 of brake ring 232 are similar to that (shown in FIG. 4) of fingers 123 and extensions 136.

A second series of projections or bosses 296 defining a circle which is, larger in diameter than that which is defined by fingers 272, extends axially to the right (as viewed in FIG. 13) from hub portion 270 of rotatable ring gear 254 in radially spaced relationship to fingers 272. The bosses 296 have side edges 297 which respectively engage different ones of compression springs 298. Bosses 296 generally correspond to bosses 96 associated with carrier 82 as illustrated in FIG. 4.

As seen in FIG. 13, an index pin 276 is attached to one of bosses 296 and travels within a slot 278 formed in one edge of intermediate section 224. Index pin 276 will indicate the degree of rotation of rotary gear 254 at any given time during operation.

Balls 231 serve to secure end ring 220 to intermediate section 224. Bolt access holes 262 are provided in surface 258 of end plate 226, in a manner identical to that of the embodiment of FIG. 3. Generally, the various gears and shafts are journaled in the FIG. 13 embodiment in a manner similar to that shown and described in the FIG. 3 embodiment.

In operation, torque supplied from motor 12' rotates shaft 238 and the torque is transmitted via sun gear 244 and planetary gears 246 to torque output gear 214. Reactive torque is transmitted through planetary gears 246 to rotatable reaction ring gear 254 which is however, restrained against rotation due to the reactive torque by the resistance offered by compression springs 298 which are engaged by bosses 296, the latter being integrally formed with reaction gear 254 as described above. When the reactive torque exceeds the strength of compression springs 298, rotatable ring gear 254 is rotated against the resistance of compression springs 298 and this shifts fingers 272 which shift extensions 256 relative to balls 294. Collar 230 is stationary so that balls 294 are held in position until sufficient shifting occurs to bring cam surfaces 257 of extensions 256 into contact with balls 294. This urges balls 294 inwardly into braking engagement with the outer surface of adaptor 236.

As with the embodiment of FIGS. 1–4, end ring 220 may be rotated to change the initial or starting distance between fingers 256 and balls 294. This is done by loosening bolts 231, and rotating end ring 220 by means of rotation handle 221. Rotation handle 221 is recessed and a suitable tool may be employed to engage it to rotate ring 220. With ring 220 properly positioned, bolts 231 are retightened. This adjusts the total travel required of fingers 272 to initiate the braking action.

The torque tools of the invention, by providing a smooth acting braking action, enable selective control of torque output levels without impacting the torque object. The result is an efficient smoothly operating tool. The features of adjustment, either by rotating the end ring or by replacing the restraint means with restraint means of different resistance strength, provide a wide range of accurately selected torque output levels. The torque tools of the invention are conveniently employed with pneumatic motors which, upon braking of the transmission shaft, will simply stall out without damage to the motor.

Further, it will be apparent that the torque tool of the invention is of the type which can apply torque in either a clockwise or counterclockwise direction, depending on the setting of a selector control. Such selectors per se are well known and therefore not described above, although the operator's selector control is illustrated (un-numbered) in FIG. 1 as the dial located on handle 14 to the right of and above trigger 16. The ability to reverse torque gives the tool flexibility of use and the ability to "back-off" after torquing an object.

While the invention has been described in detail with reference to specific embodiments thereof, it will be apparent that numerous alterations and modifications may be made to the specific embodiment without departing from the spirit and scope of the invention.

Having thus described the invention I claim:

1. A torque tool comprising:
   a. a transmission means adapted to be connected to a motor for rotation thereby and including a driven shaft assembly and an input gear rotatable therewith;
   b. first planetary gear means drivingly engaged with said input gear for rotation thereby;
   c. a torque output gear drivingly connected through said first planetary gear means with said transmission means for rotation of said output gear to transmit output torque therethrough;
   d. a rotatable reaction ring gear drivingly connected with said output gear so as to sense reactive torque transmitted through said output gear in reaction to said output torque;
   e. a brake means assembly including means shiftable from a first nonbraking position into braking engagement with said shaft assembly of said transmission means;
   f. restraint means structurally associated with said brake means assembly to provide a predetermined resistance to shifting of said brake means assembly from said first position into said braking engagement;
   g. means connecting said brake means assembly to said rotatable ring gear whereby said rotatable ring gear is held against rotation relative thereto by said brake means assembly;

so that upon attainment of a preselected torque output and concomitant reactive torque, the latter is transmitted through said rotatable ring gear whereby said rotatable ring gear rotates to shift said brake means assembly against said resistance and from said first position into braking engagement with said shaft assembly of said transmission means to limit the effective torque throughput thereof.

2. The torque tool of claim 1 further including:
   (a) a second planetary gear means; and
   (b) a stationary ring gear;

and wherein: said means connecting said brake means assembly to said rotatable ring gear comprises said second planetary gear means; said second planetary gear means is meshed with said rotatable ring gear and said stationary ring gear for orbiting in the latter and is connected to said brake means assembly; said second planetary gear means further has a gear ratio relative to said stationary ring gear such that a preselected proportion of said reactive torque is required to orbit said second planetary gear means in said stationary ring gear whereby only the balance of said reactive torque is available to shift said brake means against said predetermined resistance strength and into said braking engagement.

3. A torque tool comprising:
   a. a housing having an input end and an output end;
   b. a transmission shaft received within said housing and having an input portion and an output portion;
   c. input means on said input portion of said shaft to receive input torque from a motor;
   d. a sun gear on said output portion of said shaft;
   e. first planetary gear means meshed with said sun gear for rotation thereby;
   f. a torque output gear journaled in said output end of said housing and meshed with said first planetary gear means, said output gear being adapted to transmit output torque from said tool;
   g. a rotatable reaction ring gear journaled in said housing intermediate said input and output ends thereof and meshed with said first planetary gear means for rotation thereby in response to reactive torque acting through said first planetary gear means;
   h. brake assembly means mounted within said housing and including a carrier, at least one brake member carried by said carrier, and shiftable means mounted for at least limited shifting of said carrier from a first position to a second position in which said braking members are in braking engagement with said transmission shaft, said brake members being carried by said carrier in a non-braking position relative to said shaft when said carrier means is in said first position;
   i. restraint means engaging said shiftable means to resist said rotation of said carrier from said first position, said restraint means having a predetermined resistance to such shifting;

j. a stationary reaction ring gear fixedly mounted within said housing so that it is non-rotatable relative thereto;

k. second planetary gear means meshed with said rotatable ring gear and with said stationary ring gear and connected to said carrier whereby rotation of said rotatable ring gear to orbit said second planetary gear means in said stationary ring gear is resisted (1) be said stationary ring gear to a degree determined by the gear ratio between it and said second planetary gear means and, (2) by said restraint means to a degree dependent upon said resistance thereof;

whereby, upon attainment of a preselected output torque, concomitant reactive torque acts to overcome the resistance of said stationary ring gear and the resistance of said restraint means to rotation of said rotatable ring gear and rotates said rotatable ring gear to shif said shiftable means from said first position to a second position in which said brake members are in braking engagement with said transmission shaft to limit the torque throughput thereof.

4. The torque tool of claim 3 in which:
said shiftable means of said brake assembly comprises a flange attached to said carrier and connected to said second planetary gear means for movement therewith; and said carrier is mounted for shifting with said flange whereby said carrier carries said brake members into braking engagement with said shaft upon said shifting of said flange to said second position.

5. The torque tool of claim 4 further including bosses on said carrier, which bosses engage said restraint means.

6. The torque tool of claim 5 wherein said flange and said bosses are integral with said carrier.

7. The torque tool of claim 3 further including an end ring mounted at the input end of said housing, said end ring having projections thereon disposed co-axially about said input portion of said shaft to define an annular space between said input portion and said projections;
said carrier comprising a collar portion and a radially extending flange thereon, said collar portion mounted for at least a limited rotation through said annular space and said radially extending flange comprising said shiftable means;
said second planetary gear means being connected to said radially extending flange so that said opening of said second planetary means rotates said carrier about its longitudinal axis;
one or more bosses projecting from said flange and engaging said restraint means;
said brake members being carried by said collar portion within said annular space;
at least one bearing surface projecting into said annular space so that said bearing surface is spaced from said braking members when said carrier is in said first position, and engages said braking members to force said braking members into braking engagement with said input portion of said shaft when said carrier is in said second position.

8. The torque tool of claim 7 wherein said end ring is adjustably mounted in said housing so that the distance between said at least one bearing surface and said one or more brake members when said carrier is in said first position is adjustable.

9. The torque tool of claim 8 wherein said collar portion has radially extending passages formed therein and said brake members comprise balls carried in said radially extending passages in said collar.

10. The torque tool of claim 8 wherein said restraint means are compression springs.

* * * * *

UNITED STATES PATENT AND TRADEMARK OFFICE
CERTIFICATE OF CORRECTION

PATENT NO. : 4,155,275
DATED : MAY 22, 1979
INVENTOR(S) : RAYMOND H. DEVANNEY

It is certified that error appears in the above-identified patent and that said Letters Patent are hereby corrected as shown below:

Column 7, line 14, after "planetary", insert -- gear --

Signed and Sealed this

Sixth Day of November 1979

[SEAL]

Attest:

RUTH C. MASON
*Attesting Officer*

LUTRELLE F. PARKER
*Acting Commissioner of Patents and Trademarks*